United States Patent
Aoki et al.

(10) Patent No.: US 12,378,429 B2
(45) Date of Patent: Aug. 5, 2025

(54) INK COMPOSITION FOR PHOTOCURABLE INKJET PRINTING

(71) Applicant: SAKATA INX CORPORATION, Osaka (JP)

(72) Inventors: Yoshiyuki Aoki, Osaka (JP); Ryoichi Nitta, Osaka (JP); Koki Ogasahara, Osaka (JP); Okinori Nakashima, Osaka (JP)

(73) Assignee: SAKATA INX CORPORATION, Osaka (JP)

( * ) Notice: Subject to any disclaimer, the term of this patent is extended or adjusted under 35 U.S.C. 154(b) by 218 days.

(21) Appl. No.: 18/032,552

(22) PCT Filed: Jul. 6, 2021

(86) PCT No.: PCT/JP2021/025449
§ 371 (c)(1),
(2) Date: Apr. 18, 2023

(87) PCT Pub. No.: WO2022/085246
PCT Pub. Date: Apr. 28, 2022

(65) Prior Publication Data
US 2023/0383134 A1    Nov. 30, 2023

(30) Foreign Application Priority Data
Oct. 23, 2020  (JP) ................ 2020-178252

(51) Int. Cl.
C09D 11/38    (2014.01)
C09D 11/101   (2014.01)
C09D 11/322   (2014.01)

(52) U.S. Cl.
CPC ............ *C09D 11/38* (2013.01); *C09D 11/101* (2013.01); *C09D 11/322* (2013.01)

(58) Field of Classification Search
CPC ...... C09D 11/38; C09D 11/322; C09D 11/101
See application file for complete search history.

(56) References Cited

U.S. PATENT DOCUMENTS

| | | | |
|---|---|---|---|
| 7,220,306 B2 | 5/2007 | Kano et al. | |
| 7,220,307 B2 | 5/2007 | Kano et al. | |
| 2008/0180503 A1* | 7/2008 | Umebayashi | C09D 11/54 347/100 |
| 2015/0184005 A1 | 7/2015 | Howald et al. | |
| 2017/0158890 A1 | 6/2017 | Hirose et al. | |
| 2018/0030290 A1 | 2/2018 | Hirose et al. | |
| 2019/0023052 A1 | 1/2019 | Oshima et al. | |
| 2019/0241757 A1 | 8/2019 | Ohara et al. | |
| 2022/0056286 A1 | 2/2022 | Hishinuma et al. | |
| 2022/0251408 A1 | 8/2022 | Ohara et al. | |

FOREIGN PATENT DOCUMENTS

| | | | | |
|---|---|---|---|---|
| CN | 1884401 | A | 12/2006 | |
| CN | 102417760 | A | 4/2012 | |
| CN | 106536645 | A | 3/2017 | |
| CN | 107216715 | A | 9/2017 | |
| CN | 107250294 | A | 10/2017 | |
| CN | 108047031 | A | 5/2018 | |
| CN | 108948232 | A | 12/2018 | |
| EP | 4173825 | A1 | 5/2023 | |
| EP | 4194519 | A1 | 6/2023 | |
| JP | 2004083872 | A | 3/2004 | |
| JP | 2011213965 | A | 10/2011 | |
| JP | 2017109420 | A | 6/2017 | |
| JP | 2018024758 | A | 2/2018 | |
| JP | 2018087344 | A | 6/2018 | |
| JP | 2019119748 | A | 7/2019 | |
| JP | 2019137735 | A | 8/2019 | |
| WO | 03076527 | A1 | 9/2003 | |
| WO | 2004000950 | A1 | 12/2003 | |
| WO | WO-2019139948 | A1 * | 7/2019 | ......... B41M 5/0023 |
| WO | 2020138132 | A1 | 7/2020 | |

OTHER PUBLICATIONS

Japanese Patent Office; International Search Report and Written Opinion for International Application No. PCT/JP2021/025449 dated Oct. 5, 2021, 8 Pages.
International Bureau of WIPO; English Translation of International Preliminary Report on Patentability for International Application No. PCT/JP2021/025449 dated May 4, 2023, 5 Pages.
Chinese Patent Office; Office Action for Chinese Patent Application No. 202180055268.3 dated Mar. 15, 2024, 14 Pages.
European Patent Office; Extended European Search Report for European Patent Application No. 21882389.6 dated Aug. 20, 2024, 6 Pages.

* cited by examiner

*Primary Examiner* — Yaovi M Ameh
(74) *Attorney, Agent, or Firm* — Christopher J. Knors; Moore & Van Allen PLLC

(57) ABSTRACT

Provided is an ink composition for photo-curable inkjet printing, comprising a pigment, a photopolymerizable compound, and a photopolymerization initiator, wherein the photopolymerizable compound comprises 5 to 30% by mass of an amine-modified oligomer and 5 to 30% by mass of N,N-dimethylacrylamide, wherein the photopolymerization initiator comprises at least any one of ethoxy(2,4,6-trimethylbenzoyl)phenylphosphine oxide and bis(2,4,6-trimethylbenzoyl)phenylphosphine oxide, and wherein a total amount of ethoxy(2,4,6-trimethylbenzoyl)phenylphosphine oxide and bis(2,4,6-trimethylbenzoyl)phenylphosphine oxide is 12% by mass or less.

2 Claims, No Drawings

INK COMPOSITION FOR PHOTOCURABLE INKJET PRINTING

TECHNICAL FIELD

The present invention relates to an ink composition for photo-curable inkjet printing. More specifically, the present invention relates to an ink composition for photo-curable inkjet printing that does not require a large amount of polymerization initiator and has excellent various performances.

BACKGROUND ART

Conventionally, an ink composition for photo-curable inkjet is known which contains TPOL (ethoxy(2,4,6-trimethylbenzoyl)phenylphosphine oxide) and Irgacure819 (bis(2,4,6-trimethylbenzoyl)phenylphosphine oxide) (Patent Document 1).

PRIOR ART DOCUMENT

Patent Document

Patent Document 1: JP 2019-137735 A

SUMMARY OF THE INVENTION

However, the ink composition described in Patent Document 1 requires a certain amount or more of initiator in order to impart a sufficient curability. However, when a large amount of initiator is compounded in consideration of curability, coating performance is poor. In addition, due to the recent revision of safety information, there has been a need for a formulation design that eliminates TPO ((2,4,6-trimethylbenzoyl)diphenylphosphine oxide).

The present invention has been made in view of such conventional problems, and it is an object of the present invention to provide an ink composition for photo-curable inkjet printing that does not require a large amount of polymerization initiator and has excellent various performances.

As a result of intensive studies to solve the above-described problems, the present inventors have found that an ink composition for photo-curable inkjet printing which contains a pigment, a photopolymerizable compound, and a predetermined photopolymerization initiator can solve the above-described problems, and completed the present invention.

The ink composition for photo-curable inkjet printing according to one embodiment of the present invention for solving the above-described problems comprises a pigment, a photopolymerizable compound, and a photopolymerization initiator, wherein the photopolymerizable compound comprises 5 to 30% by mass of an amine-modified oligomer and 5 to 30% by mass of N,N-dimethylacrylamide, wherein the photopolymerization initiator comprises at least any one of ethoxy(2,4,6-trimethylbenzoyl)phenylphosphine oxide and bis(2,4,6-trimethylbenzoyl)phenylphosphine oxide, and wherein a total amount of ethoxy(2,4,6-trimethylbenzoyl)phenylphosphine oxide and bis(2,4,6-trimethylbenzoyl)phenylphosphine oxide is 12% by mass or less.

According to such a configuration, the ink composition for photo-curable inkjet printing does not require a large amount of polymerization initiator and has excellent various performances.

EMBODIMENT FOR CARRYING OUT THE INVENTION

<Ink Composition for Photo-Curable Inkjet Printing>

The ink composition for photo-curable inkjet printing (hereinafter also referred to as an ink composition) according to one embodiment of the present invention comprises a pigment, a photopolymerizable compound, and a photopolymerization initiator. The photopolymerizable compound comprises 5 to 30% by mass of an amine-modified oligomer and 5 to 30% by mass of N,N-dimethylacrylamide. The photopolymerization initiator comprises at least any one of ethoxy(2,4,6-trimethylbenzoyl)phenylphosphine oxide and bis(2,4,6-trimethylbenzoyl)phenylphosphine oxide. A total amount of ethoxy(2,4,6-trimethylbenzoyl)phenylphosphine oxide and bis(2,4,6-trimethylbenzoyl)phenylphosphine oxide is 12% by mass or less.

(Pigment)

The pigment is not particularly limited. By way of an example, examples of the pigment include various organic pigments and inorganic pigments. The organic pigments are dye lake pigments, azo-based, benzoimidazolone-based, phthalocyanine-based, quinacridone-based, anthraquinone-based, dioxazine-based, indigo-based, thioindigo-based, perylene-based, perinone-based, diketo-pyrrolo-pyrrole-based, isoindolinone-based, nitro-based, nitroso-based, anthraquinone-based, flavanthrone-based, quinophthalone-based, pyranthrone-based, or indanthrone-based pigments, or the like.

The inorganic pigments are colored pigments such as titanium oxide, red oxide, antimony red, cadmium yellow, cobalt blue, ultramarine blue, navy blue, iron black, chrome oxide green, carbon black, and graphite (including achromatic color pigments such as white and black), extender pigments such as calcium carbonate, kaolin, clay, barium sulfate, aluminum hydroxide, and talc, or the like.

Specific examples of representative pigments for each hue of the ink composition of the present embodiment are as follows. A yellow pigment is C. I. Pigment Yellow 1, 2, 3, 12, 13, 14, 16, 17, 42, 73, 74, 75, 81, 83, 87, 93, 95, 97, 98, 108, 109, 114, 120, 128, 129, 138, 139, 150, 151, 155, 166, 180, 184, 185, 213, or the like, preferably C. I. Pigment Yellow 150, 155, 180, 213, or the like.

A magenta pigment is C. I. Pigment Red 5, 7, 12, 22, 38, 48:1, 48:2, 48:4, 49:1, 53:1, 57, 57:1, 63:1, 101, 102, 112, 122, 123, 144, 146, 149, 168, 177, 178, 179, 180, 184, 185, 190, 202, 209, 224, 242, 254, 255, 270, C. I. Pigment Violet 19, or the like, preferably C. I. Pigment Red 122, 202, Pigment Violet 19, or the like.

A cyan pigment is C. I. Pigment Blue 1, 2, 3, 15, 15:1, 15:2, 15:3, 15:4, 16, 18, 22, 27, 29, 60, or the like, preferably C. I. Pigment Blue 15:4 or the like.

A black pigment is carbon black (C. I. Pigment Black 7) or the like.

A white pigment is titanium oxide, aluminum oxide, or the like, preferably titanium oxide surface-treated with various materials such as alumina and silica or, the like.

A content of the pigment is not particularly limited. By way of an example, a content of pigments other than the white pigment is preferably 0.5% by mass or more, and more preferably 1% by mass or more, in the ink composition. Moreover, the content of pigments other than the white pigment is preferably 10% by mass or less, and more preferably 7% by mass or less, in the ink composition. On the other hand, a content of the white pigment is preferably 8% by mass or more, and more preferably 10% by mass or more, in the ink composition. Moreover, the content of the white pigment is preferably 18% by mass or less, and more preferably 15% by mass or less, in the ink composition. When the contents of the pigments are within the above-described ranges, the ink composition has an advantage of having an appropriate coloring power, not adversely affecting coating physical properties of a cured coating film.
(Photopolymerizable Compound)

The photopolymerizable compound comprises 5 to 30% by mass of an amine-modified oligomer and 5 to 30% by mass of N,N-dimethylacrylamide.

Amine-Modified Oligomer

The amine-modified oligomer is not particularly limited. By way of an example, the amine-modified oligomer is an acrylated amine compound such as CN371, CN373, CN383, and CN386 (manufactured by Sartomer), which is an oligomer of the acrylated amine compound having two photopolymerizable functional groups and two amino groups in a molecule.

A content of the amine-modified oligomer may be 5% by mass or more, preferably 10% by mass or more, in the ink composition. Moreover, the content of the amine-modified oligomer may be 30% by mass or less, preferably 20% by mass or less, in the ink composition. When the content of the amine-modified oligomer is less than 5% by mass, surface curability, tackiness, and abrasion resistance tend to be poor. On the other hand, when the content of the amine-modified oligomer exceeds 30% by mass, the ink composition tends to have excessively increased viscosity and poor performance balance.

N,N-dimethylacrylamide

A content of N,N-dimethylacrylamide may be 5% by mass or more, preferably 10% by mass or more, in the ink composition. Moreover, the content of N,N-dimethylacrylamide may be 30% by mass or less, preferably 20% by mass or less, in the ink composition. When the content of N,N-dimethylacrylamide is less than 5% by mass, curability tends to decrease. On the other hand, when the content of N,N-dimethylacrylamide exceeds 30% by mass, adhesiveness to a base material tends to decrease.
(Photopolymerization Initiator)

The photopolymerization initiator comprises at least any one of ethoxy(2,4,6-trimethylbenzoyl)phenylphosphine oxide and bis(2,4,6-trimethylbenzoyl)phenylphosphine oxide.

In the ink composition of the present embodiment, the total amount of ethoxy(2,4,6-trimethylbenzoyl)phenylphosphine oxide and bis(2,4,6-trimethylbenzoyl)phenylphosphine oxide may be 12% by mass or less, preferably 3% by mass or more. Moreover, the total amount of ethoxy(2,4,6-trimethylbenzoyl)phenylphosphine oxide and bis(2,4,6-trimethylbenzoyl)phenylphosphine oxide is preferably 10% by mass or less, and more preferably 9% by mass or less. When the total amount of ethoxy(2,4,6-trimethylbenzoyl)phenylphosphine oxide and bis(2,4,6-trimethylbenzoyl)phenylphosphine oxide exceeds 12% by mass, banding tends to decrease.
(Optional Components)

The ink composition of the present embodiment may appropriately comprise the following components in addition to the above-described components.

Organic Solvent

An organic solvent is not particularly limited. By way of an example, examples of the organic solvent include propylene carbonate, diethylene glycol dialkyl ether, and dipropylene glycol alkyl ether acetate, etc. The organic solvent may be used in combination.

Diethylene glycol dialkyl ether is preferably diethylene glycol ethyl methyl ether or diethylene glycol diethyl ether.

Dipropylene glycol alkyl ether acetate is preferably an alkyl group having 6 or less carbon atoms, and more preferably an alkyl group having 3 or less carbon atoms.

In order to adjust drying property and further improve anti-mottling property, the organic solvent may be used in combination with an alkylene glycol derivative having a flash point of 50 to 150° C.

The alkylene glycol derivative having a flash point of 50 to 150° C. is (poly)ethylene glycol dialkyl ether such as triethylene glycol dimethyl ether, triethylene glycol diethyl ether, and tetraethylene glycol dimethyl ether, (poly)propylene glycol dialkyl ether such as propylene glycol dimethyl ether, propylene glycol diethyl ether, dipropylene glycol dimethyl ether, dipropylene glycol diethyl ether, tetrapropylene glycol diethyl ether, and tetrapropylene glycol dimethyl ether, (poly)propylene glycol monoalkyl ether such as propylene glycol monobutyl ether, dipropylene glycol monomethyl ether, and dipropylene glycol monoethyl ether, (poly)propylene glycol monoalkyl ether monoalkyl ester such as propylene glycol monoethyl ether acetate, propylene glycol monobutyl ether acetate, dipropylene glycol monomethyl ether acetate, dipropylene glycol monoethyl ether acetate, and dipropylene glycol monobutyl ether acetate, (poly)ethylene glycol monoalkyl ether such as ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, and tetraethylene glycol monobutyl ether, (poly)ethylene glycol monoalkyl ether monoalkyl ester such as ethylene glycol monomethyl ether acetate, ethylene glycol monoethyl ether acetate, ethylene glycol monobutyl ether acetate, diethylene glycol monomethyl ether acetate, and triethylene glycol monomethyl ether acetate, (poly)ethylene glycol diester such as ethylene glycol diacetate, diethylene glycol diacetate, and triethylene glycol diacetate, (poly)ethylene glycol monoether monoesters such as diethylene glycol monoethyl ether acetate, diethylene glycol monobutyl ether acetate, diethylene glycol monopropyl ether acetate, triethylene glycol monoethyl ether acetate, and triethylene glycol monobutyl ether acetate, or the like.

Moreover, an organic solvent such as ethylene glycol diethyl ether, ethylene glycol dimethyl ether, propylene glycol monomethyl ether, propylene glycol monoethyl ether, and propylene glycol monomethyl ether acetate may be used in combination, which is not in the flash point range of 50 to 150° C., within a range that does not significantly change a flash point of the entire solvent.

Other Photopolymerizable Monomers

The ink composition of the present embodiment may comprise other monofunctional or multifunctional photopolymerizable monomers in addition to the above-described amine-modified oligomer and N,N-dimethylacrylamide.

Monofunctional Photopolymerizable Monomer

The monofunctional photopolymerizable monomer is not particularly limited. By way of an example, the monofunctional photopolymerizable monomer is benzyl methacrylate, butyl (meth)acrylate, ethyl carbitol (meth)acrylate, 2-methoxyethyl (meth)acrylate, 2-methoxybutyl (meth) acrylate, 4-hydroxybutyl (meth)acrylate, diethylene glycol monoethyl ether (meth)acrylate, ethoxydiethylene glycol (meth)acrylate, caprolactone (meth)acrylate, methoxytripropylene glycol (meth)acrylate, phenoxyethyl (meth)acrylate, monofunctional (meth)acrylate such as EO (ethylene oxide)-modified succinic acid (meth)acrylate, acryloylmorpholine, acrylonitrile, acrylamide, diethylacrylamide, vinylmethyloxazolidinone, styrene, (meth)acrylic acid, or the like.

When a monofunctional photopolymerizable monomer is compounded, a content of the monofunctional photopolymerizable monomer is not particularly limited. By way of an example, the content of the monofunctional photopolymerizable monomer is preferably 40% by mass or more, and more preferably 50% by mass or more, in the ink composition. Moreover, the content of the monofunctional photopolymerizable monomer is preferably 80% by mass or less, and more preferably 70% by mass or less, in the ink composition. When the content of the monofunctional photopolymerizable monomer is within the above-described ranges, there is an advantage that the cured coating film of the ink composition has an excellent coating film resistance such as abrasion resistance.

Polyfunctional Photopolymerizable Monomer

The polyfunctional photopolymerizable monomer is not particularly limited. By way of an example, the polyfunctional photopolymerizable monomer is a compound having a plurality of carbon-carbon unsaturated bonds in a molecule, examples of which include (poly)alkylene glycol di(meth)acrylate such as vinyloxyethoxyethyl (meth)acrylate, ethylene glycol di(meth)acrylate, propylene glycol di(meth)acrylate, butanediol di(meth)acrylate, dipropylene glycol di(meth)acrylates, triethylene glycol di(meth)acrylates, and tripropylene glycol di(meth)acrylate, dimethyloltricyclodecane di(meth)acrylate, neopentylglycol hydroxypivalate di(meth)acrylate, polytetramethylene glycol diacrylate, trimethylolpropane tri(meth)acrylate and an ethylene oxide modified product thereof, pentaerythritol tri (meth)acrylate, pentaerythritol tetra(meth)acrylate and an ethylene oxide modified product thereof, dipentaerythritol penta(meth)acrylate and an ethylene oxide modified product thereof, dipentaerythritol hexa(meth)acrylate and an ethylene oxide modified product thereof, urethane (meth)acrylate, epoxy (meth)acrylate, polyester (meth)acrylate, pentaerythritol ethoxytetraacrylate, caprolactam-modified dipentaerythritol hexaacrylate, ethoxylated bisphenol A diacrylate, alkoxylated tetrahydrofurfuryl acrylate, and the like.

When a polyfunctional photopolymerizable monomer is compounded, a content of the polyfunctional photopolymerizable monomer is not particularly limited. By way of an example, the content of the polyfunctional photopolymerizable monomer is preferably 10% by mass or more, and more preferably 12% by mass or more, in the ink composition. Moreover, the content of the polyfunctional photopolymerizable monomer is preferably 20% by mass or less, and more preferably 18% by mass or less, in the ink composition. When the content of the polyfunctional photopolymerizable monomer is within the above-described ranges, there is an advantage that the cured coating film of the ink composition has an excellent adhesiveness to a base material.

The ink composition of the present embodiment may comprise an acryl-based resin. The acryl-based resin is not particularly limited. By way of an example, examples of the acryl resin include a polymer composed of (meth)acrylate soluble in an organic solvent, a copolymer thereof, and the like. Examples of the (meth)acrylates include, for example, ethyl, propyl, or alkyl (meth)acrylate such as butyl (meth) acrylate; hydroxymethyl, hydroxyethyl, hydroxypropyl, hydroxybutyl, or hydroxyalkyl (meth)acrylate such as hydroxypentyl (meth)acrylate; and the like.

Moreover, examples of the acryl resin include BR-60 (Tg: 75° C.), BR-64 (Tg: 55° C.), BR-75 (Tg: 90° C.), BR-77 (Tg: 80° C.), BR-83 (Tg: 105° C.), BR-87 (Tg: 105° C.), BR-88 (Tg: 105° C.), BR-90 (Tg: 65° C.), BR-93 (Tg: 50° C.), BR-95 (Tg: 80° C.), BR-105 (Tg: 50° C.), BR-106 (Tg: 50° C.), BR-107 (Tg: 50° C.), BR-108 (Tg: 90° C.), BR-113 (Tg: 75° C.), BR-115 (Tg: 50° C.), and BR-116 (Tg: 50° C.), etc., which are manufactured by Mitsubishi Chemical Corporation.

When an acryl resin is compounded, a content of the acryl resin is not particularly limited. By way of an example, the content of the acryl resin is preferably 1% by mass or more, and more preferably 1.5% by mass or more, in the ink composition. Moreover, the content of the acryl resin is preferably 5% by mass or less, and more preferably 4% by mass or less, in the ink composition.

The ink composition of the present embodiment may comprise a vinyl chloride-based resin, a vinyl chloride-vinyl acetate-based resin, an ethylene-vinyl acetate-based resin, a styrene-acryl-based resin, a styrene-maleic acid-based resin, a rosin-based resin, a rosin ester-based resin, a petroleum resin, a coumarone indene-based resin, a terpene phenol-based resin, a phenol resin, a ketone resin, an urethane resin, a melamine resin, an urea resin, an epoxy-based resin, a cellulose-based resin, a xylene resin, an alkyd resins, an aliphatic hydrocarbon resin, a butyral resin, a maleic acid resins, a fumaric acid resins, and the like, within a range in which performances do not decrease.

Other Photopolymerization Initiators

Photopolymerization initiators other than those described above, which may be compounded in the ink composition of the present embodiment, are not particularly limited. By way of an example, examples of photopolymerization initiators other than those described above include 1-hydroxycyclohexylphenyl ketone, benzoin ethyl ether, benzyl dimethyl ketal, 2-hydroxy-2-methyl-1-phenylpropan-1-one, 1-(4-isopropylphenyl)-2-hydroxy-2-methylpropan-1-one, and 2-methyl-1-(4-methylthiophenyl)-2-morpholinopropan-1-one, etc.

When these photopolymerization initiators are compounded, a content of these photopolymerization initiators is not particularly limited. By way of an example, the content of the photopolymerization initiators is preferably 0.5% by mass or more, and more preferably 1% by mass or more, in the ink composition. Moreover, the content of the photopolymerization initiators is preferably 5% by mass or less, and more preferably 3% by mass or less, in the ink composition.

Sensitizer

A sensitizer is not particularly limited. By way of an example, the sensitizer is preferably an anthracene-based sensitizer, a thioxanthone-based sensitizer, or the like, and more preferably a thioxanthone-based sensitizer. Specifically, the sensitizer is an anthracene-based sensitizer such as 9,10-dibutoxyanthracene, 9,10-diethoxyanthracene, 9,10-dipropoxyanthracene, and 9,10-bis(2-ethylhexyloxy)anthracene, a thioxanthone-based sensitizer such as 2,4-diethylthioxanthone, 2-isopropylthioxanthone, and 4-isopropylthioxanthone, or the like. Representative examples of commercially available products include DBA and DEA (manufactured by KAWASAKI KASEI CHEMICALS LTD.) as anthracene-based sensitizers, DETX and ITX (manufactured by Lambson Ltd.) as thioxanthone-based sensitizers, and the like.

When a sensitizer is compounded, a content of the sensitizer is not particularly limited. By way of an example, the content of the sensitizer is preferably 0.5% by mass or more, and more preferably 0.8% by mass or more, in the ink composition. Moreover, the content of the sensitizer is preferably 3% by mass or less, and more preferably 2% by mass or less, in the ink composition. When the content of the sensitizer is within the above-described ranges, there is an advantage that color change of the cured coating film of the ink composition over time can be suppressed.

Besides, when the ink composition comprises a thioxanthone-based sensitizer as a sensitizer, the ink composition easily turns yellow. Therefore, the ink composition has a more yellowish hue than a color based on a pigment (original hue), and thus it is preferable to appropriately determine a content of the thioxanthone-based sensitizer for each color. Specifically, in a white ink composition and a clear ink composition that are easily affected by a change in color, it is preferable that the ink composition does not comprise a thioxanthone-based sensitizer as a sensitizer. Moreover, in a magenta ink composition and a cyan ink composition, since a vinylamide compound is used in combination as a photopolymerizable compound, a cured coating film, which is discolored to yellow, fades, and a change in hue easily becomes a problem. Therefore, it is preferable to use a photosensitizer within a range in which there is no problem in hue. Furthermore, since a black ink composition and a yellow ink composition are less likely to affect hue even if they are discolored and they have poorer photopolymerizability than other hue, it is preferable to use a thioxanthone-based sensitizer in combination as a photopolymerization initiator.

Surface Treatment Agent

A surface treatment agent is not particularly limited. By way of an example, the surface treatment agent is a silicone-based surface treatment agent, an acryl-based surface treatment agent, a vinyl-based surface treatment agent, a fluorine-based surface treatment agent, an acetylene glycol-based surface treatment agent, or the like.

When a surface treatment agent is compounded, a content of the surface treatment agent is not particularly limited. By way of an example, the content of the surface treatment agent is preferably 0.1% by mass or more, and more preferably 0.5% by mass or more, in the ink composition. Moreover, the content of the surface treatment agent is preferably 1.5% by mass or less, and more preferably 1% by mass or less, in the ink composition. When the content of the surface treatment agent is within the above-described ranges, the ink composition has advantages of exhibiting a good ejection stability and having an excellent print image quality.

Dispersant

A dispersant is not particularly limited. By way of an example, the dispersant is an ionic or nonionic surfactant, an anionic, cationic, or nonionic polymer compound, or the like. Among them, the dispersant is preferably a polymer compound, which is preferably a carbodiimide-based compound described in JP 2004-083872 A, WO 2003/076527, and WO 2004/000950, AJISPER PB821, 822 (manufactured by Ajinomoto Fine-Techno Co., Inc.) (both acid value and amine value are 10 to 20 mgKOH/g), Solsperse 56000 (manufactured by Lubrizol Japan Limited), Solsperse 32000 (manufactured by Lubrizol Japan Limited), Solsperse 39000 (manufactured by Lubrizol Japan Limited), or DISPERBYK (manufactured by BYK Japan KK), which is a functional group-containing copolymer, or the like.

When a dispersant is compounded, a content of the dispersant is not particularly limited. By way of an example, the content of the dispersant is preferably 10% by mass or more, and more preferably 15% by mass or more, based on 100% by mass of the pigment. Moreover, the content of the dispersant is preferably 60% by mass or less, and more preferably 50% by mass or less, based on 100% by mass of the pigment. When the content of the dispersant is within the above-described ranges, the ink composition has an advantage of being excellent in viscosity stability.

Referring back to the descriptions of the ink composition as a whole, viscosity of the ink composition of the present embodiment is not particularly limited. By way of an example, viscosity (25° C.) of the ink composition is preferably 30.0 mPa·s or less, and more preferably 20.0 mPa·s or less. When viscosity of the ink composition is within the above-described ranges, the ink composition is easily ejected from an inkjet printing nozzle. Besides, viscosity can be measured using an E-type viscometer (trade name: RE100L type viscometer manufactured by Toki Sangyo Co., Ltd.) under a condition of 25° C. and 20 rpm.

As described above, according to the present embodiment, an ink composition that does not require a large amount of polymerization initiator and that can form a coating film with an excellent performance can be obtained.

<Method of Preparing Ink Composition>

A method of preparing the ink composition of the present embodiment is not particularly limited. By way of an example, the ink composition can be prepared by being dispersed and mixed using a disperser such as a wet type circulation mill, a bead mill, a ball mill, a sand mill, an attritor, a roll mill, a DCP mill, an agitator, a Henschel mixer, a colloid mill, an ultrasonic homogenizer, a high-pressure homogenizer (Micro fluidizer, Nanomizer, Ultimizer, Genus PY, DeBEE2000, etc.), and a pearl mill.

<Application of Ink Composition>

The ink composition of the present embodiment can be used for well-known applications including a paper base material, and among them, it is particularly appropriate for a surface layer of a base material that requires abrasion resistance and consists of non-absorbent materials.

Non-absorbent materials are metals, resins, ceramics, and the like. Among them, the ink composition is preferably used for a surface layer having resin as a base material and further for targeting a surface layer consisting of a vinyl chloride-based polymer or an ethylene-vinyl acetate-based copolymer, a vinyl chloride resin, polyethylene terephthalate, polycarbonate, and the like, as resin, from the viewpoints of water resistance, etc. Moreover, when resin consists of polyethylene terephthalate (PET), a vinyl chloride resin, polycarbonate, tarpaulin, an acryl-based resin, and the like, the ink composition is excellent in adhesiveness, etc.

A method of printing and curing the ink composition of the present embodiment is not particularly limited. By way of an example, the method of printing and curing is a method of ejecting the ink composition onto a base material with an inkjet head, and then exposing a coating film of the ink composition landed on the base material to light and curing it. The ejection onto the base material (printing of an image) can be performed by supplying the ink composition to a printer head for low viscosity of an inkjet recording printer and ejecting it from the printer head so that the thickness of the coating film is adjusted to 1 to 60 μm with respect to the base material. Moreover, exposure to light and curing (curing of an image) can be performed by irradiating the coating film of the ink composition coated on the base material as an image with light.

An ink jet recording type printer device may be a conventionally used ink jet recording type printer device. Moreover, an ultraviolet light (UV lamp), an ultraviolet light (light emitting diode (LED)), an electron beam, a visible light, or the like can be used as a light source in curing the coating film.

One embodiment of the present invention has been described above. The present invention is not particularly limited to the above-described embodiment. Besides, the above-described embodiment mainly describes an invention having the following configurations.

(1) An ink composition for photo-curable inkjet printing, comprising a pigment, a photopolymerizable compound, and a photopolymerization initiator, wherein the photopolymerizable compound comprises 5 to 30% by mass of an amine-modified oligomer and 5 to 30% by mass of N,N-dimethylacrylamide, wherein the photopolymerization initiator comprises at least any one of ethoxy(2,4,6-trimethylbenzoyl)phenylphosphine oxide and bis(2,4,6-trimethylbenzoyl)phenylphosphine oxide, and wherein a total amount of ethoxy(2,4,6-trimethylbenzoyl)phenylphosphine oxide and bis(2,4,6-trimethylbenzoyl)phenylphosphine oxide is 12% by mass or less.

According to such a configuration, the ink composition for photo-curable inkjet printing does not require a large amount of polymerization initiator and has excellent various performances.

EXAMPLE

Hereinafter, the present invention will be described in more detail with reference to Examples. The present invention is not limited to these Examples. Besides, unless otherwise specified, "%" means "% by mass", and "part" means "part by mass".

Raw materials used and a preparation method are shown below.

(Amine-Modified Oligomer)
    CN371 (manufactured by Sartomer)
(Photopolymerizable Compound)
    N,N-dimethylacrylamide (monofunctional photopolymerizable compound, Tg: 119° C.)
    N-vinylcaprolactam (monofunctional photopolymerizable compound, Tg: 125° C.)
    Benzyl acrylate (monofunctional photopolymerizable compound, Tg: 11° C.)
    Isobornyl acrylate (monofunctional photopolymerizable compound, Tg: 88° C.)
    Acryloylmorpholine (monofunctional photopolymerizable compound, Tg: 145° C.)
    1,6-hexanediol diacrylate (bifunctional photopolymerizable compound, Tg: 43° C.)
(Photopolymerization Initiator)
    TPOL: Ethoxy(2,4,6-trimethylbenzoyl)phenylphosphine oxide
    Omnirad 819: Bis(2,4,6-trimethylbenzoyl)phenylphosphine oxide (manufactured by IGM Resins B.I.V.)
    TPO: 2,4,6-trimethylbenzoyl-diphenyl-phosphine oxide (manufactured by Lambson Ltd.)
(Sensitizer)
    DETX: Diethylthioxanthone (manufactured by Lambson Ltd.)
(Surface Treatment Agent)
    BYK-315N: Polyester-modified polymethylalkylsiloxane surfactant, solid content: 25% by mass, solvent component: a mixture having 1/1 mass ratio of methoxypropyl acetate to phenoxyethanol (manufactured by BYK Japan KK)
(Coloring Material (Pigment))
    PB15:4 Pigment blue 15:4
    P. R. 122 Pigment red 122
    P. Y. 150 Pigment yellow 150
    P. Bk. 7 Pigment black 7
(Dispersant)
    Solsperse 32000 (manufactured by Lubrizol Japan Limited)
    PB821 (manufactured by Ajinomoto Fine-Techno Co., Inc.)

EXAMPLES 1 TO 8 AND COMPARATIVE EXAMPLES 1 TO 7

According to the compoundings in Table 1 (a compounding ratio of each material is based on % by mass), each material was stirred and mixed to obtain ink compositions for photo-curable inkjet printing of Examples 1 to 8 and Comparative examples 1 to 7. The following evaluations were performed using the obtained ink compositions. The results are shown in Table 1.

TABLE 1

| | | Example | | | | | | | |
|---|---|---|---|---|---|---|---|---|---|
| | | 1 | 2 | 3 | 4 | 5 | 6 | 7 | 8 |
| Amine-modified oligomer | CN371 | 12.0 | 12.0 | 12.0 | 12.0 | 30.0 | 5.0 | 12.0 | 12.0 |
| Monofunctional photopolymerizable compound | N,N-dimethylacrylamide (Tg: 119° C.) | 12.0 | 12.0 | 12.0 | 12.0 | 12.0 | 12.0 | 5.0 | 30.0 |
| | N-vinyl caprolactam (Tg: 125° C.) | — | — | — | — | — | — | — | — |
| | Benzyl acrylate (Tg: 11° C.) | 23.1 | 22.2 | 22.9 | 23.8 | 8.8 | 28.8 | 24.8 | 14.8 |
| | Isobornyl acrylate (Tg: 88° C.) | 15.0 | 15.0 | 15.0 | 15.0 | 15.0 | 15.0 | 21.0 | 10.0 |
| | Acryloylmorpholine (Tg: 145° C.) | 10.0 | 10.0 | 10.0 | 10.0 | 10.0 | 10.0 | 10.0 | 6.0 |
| Bifunctional photopolymerizable compound | 1,6-hexanediol diacrylate (Tg: 43° C.) | 15.0 | 15.0 | 15.0 | 13.0 | 13.0 | 13.0 | 13.0 | 13.0 |
| Photopolymerization initiator | TPOL | 4.0 | 4.0 | 3.5 | 3.5 | 2.0 | 4.5 | 3.5 | 3.5 |
| | Omnirad 819 | 6.0 | 5.5 | 5.5 | 6.0 | 4.5 | 7.0 | 6.0 | 6.0 |
| | TPO | — | — | — | — | — | — | — | — |

TABLE 1-continued

| | | | | | | | | | |
|---|---|---|---|---|---|---|---|---|---|
| Sensitizer | DETX | 0.2 | 0.4 | 0.8 | 2.0 | 2.0 | 2.0 | 2.0 | 2.0 |
| Surfactant | BYK-315N | 0.5 | 0.5 | 0.5 | 0.5 | 0.5 | 0.5 | 0.5 | 0.5 |
| Pigment | PB15:4 | 1.6 | — | — | — | — | — | — | — |
| | P. R. 122 | — | 2.4 | — | — | — | — | — | — |
| | P. Y. 150 | — | — | 2.0 | — | — | — | — | — |
| | P. Bk. 7 | — | — | — | 1.6 | 1.6 | 1.6 | 1.6 | 1.6 |
| Dispersant | SS32000 | 0.6 | 1.0 | 0.8 | — | — | — | — | — |
| | PB821 | — | — | — | 0.6 | 0.6 | 0.6 | 0.6 | 0.6 |
| Total | | 100.0 | 100.0 | 100.0 | 100.0 | 100.0 | 100.0 | 100.0 | 100.0 |
| Evaluation result | Viscosity (mPa · s) | 12.8 | 13.2 | 12.9 | 12.8 | 20.0 | 9.8 | 13.3 | 12.4 |
| | Ejection stability | ○ | ○ | ○ | ○ | ○ | ○ | ○ | ○ |
| | Viscosity stability | ○ | ○ | ○ | ○ | ○ | ○ | ○ | ○ |
| | Curability | ○ | ○ | ○ | ○ | ○ | Δ | Δ | ○ |
| | Adhesiveness to a base material | ○ | ○ | ○ | ○ | ○ | Δ | ○ | Δ |
| | Bending resistance | ○ | ○ | ○ | ○ | ○ | Δ | ○ | ○ |
| | Abrasion resistance | ○ | ○ | ○ | ○ | ○ | ○ | ○ | ○ |
| | Solvent resistance | ○ | ○ | ○ | ○ | ○ | ○ | ○ | ○ |
| | Banding | ○ | ○ | ○ | ○ | ○ | Δ | ○ | Δ |

| | | Comparative example | | | | | | |
|---|---|---|---|---|---|---|---|---|
| | | 1 | 2 | 3 | 4 | 5 | 6 | 7 |
| Amine-modified oligomer | CN371 | 12.0 | 12.0 | 12.0 | 12.0 | 12.0 | 3.0 | 35.0 |
| Monofunctional photopolymerizable compound | N,N-dimethylacrylamide (Tg: 119° C.) | 12.0 | 12.0 | 35.0 | 3.0 | — | 12.0 | 12.0 |
| | N-vinyl caprolactam (Tg: 125° C.) | — | — | — | — | 12.0 | — | — |
| | Benzyl acrylate (Tg: 11° C.) | 20.8 | 23.8 | 9.8 | 34.3 | 25.3 | 32.3 | 4.8 |
| | Isobornyl acrylate (Tg: 88° C.) | 15.0 | 15.0 | 10.0 | 15.0 | 15.0 | 15.0 | 15.0 |
| | Acryloylmorpholine (Tg: 145° C.) | 10.0 | 10.0 | 6.0 | 10.0 | 10.0 | 10.0 | 10.0 |
| Bifunctional photopolymerizable compound | 1,6-hexanediol diacrylate (Tg: 43° C.) | 13.0 | 13.0 | 13.0 | 13.0 | 13.0 | 13.0 | 13.0 |
| Photopolymerization initiator | TPOL | 4.5 | — | 3.5 | 3.5 | 3.5 | 4.0 | 2.0 |
| | Omnirad 819 | 8.0 | — | 6.0 | 4.5 | 4.5 | 6.0 | 3.5 |
| | TPO | — | 9.5 | — | — | — | — | — |
| Sensitizer | DETX | 2.0 | 2.0 | 2.0 | 2.0 | 2.0 | 2.0 | 2.0 |
| Surfactant | BYK-315N | 0.5 | 0.5 | 0.5 | 0.5 | 0.5 | 0.5 | 0.5 |
| Pigment | PB15:4 | — | — | — | — | — | — | — |
| | P. R. 122 | — | — | — | — | — | — | — |
| | P. Y. 150 | — | — | — | — | — | — | — |
| | P. Bk. 7 | 1.6 | 1.6 | 1.6 | 1.6 | 1.6 | 1.6 | 1.6 |
| Dispersant | SS32000 | — | — | — | — | — | — | — |
| | PB821 | 0.6 | 0.6 | 0.6 | 0.6 | 0.6 | 0.6 | 0.6 |
| Total | | 100.0 | 100.0 | 100.0 | 100.0 | 100.0 | 100.0 | 100.0 |
| Evaluation result | Viscosity (mPa · s) | 13.2 | 13.0 | 12.2 | 12.0 | 13.1 | 9.3 | 35.0 |
| | Ejection stability | ○ | ○ | ○ | ○ | ○ | ○ | x |
| | Viscosity stability | ○ | ○ | ○ | ○ | x | ○ | ○ |
| | Curability | ○ | ○ | ○ | x | ○ | x | ○ |
| | Adhesiveness to a base material | ○ | ○ | x | ○ | ○ | Δ | ○ |
| | Bending resistance | x | ○ | ○ | ○ | ○ | x | ○ |
| | Abrasion resistance | ○ | ○ | ○ | ○ | ○ | Δ | ○ |
| | Solvent resistance | ○ | ○ | Δ | ○ | ○ | Δ | ○ |
| | Banding | x | x | ○ | ○ | Δ | ○ | x |

<Viscosity>

Viscosity of the ink composition for photo-curable inkjet printing was measured under a condition of a temperature at 25° C. and a rotor rotation speed of 20 rpm using the E-type viscometer (trade name: RE100L-type viscometer, manufactured by Toki Sangyo Co., Ltd.).

<Ejection Stability>

An inkjet recording device equipped with an inkjet nozzle for low-viscosity ink and each ink composition were allowed to stand for 24 hours under an environment at 25° C., and temperatures of the inkjet recording device and the ink composition were adjusted to 25° C. Then, at 25° C., printing was continuously performed on PVC80 (manufactured by LINTEC Corporation) using each ink composition, and the evaluation was performed according to the following evaluation criteria.

(Evaluation Criteria)

o: The ink composition was able to be stably ejected without disturbing printing.

Δ: The ink composition was able to be almost stably ejected, although the printing was slightly disturbed.

x: The ink composition had disturbed printing or was not able to be stably ejected.

<Viscosity Stability>

Each ink composition was placed in a sealed glass bottle and left to stand under an environment at 25° C. and 60° C. for 3 weeks, and then viscosity was measured using the E-type viscometer.

A viscosity increase rate (%) was calculated by a calculation formula: ((Viscosity value after standing at 60° C. for 3 weeks/Viscosity value after standing at 25° C. for 3 weeks)×100))−100, and evaluated according to the following evaluation criteria.

(Evaluation Criteria)
  o: The viscosity increase rate was less than 10%.
  Δ: The viscosity increase rate was 10% or more and less than 20%.
  x: The viscosity increase rate was 20% or more.

<Curability>

The inkjet recording device equipped with an inkjet nozzle for low-viscosity ink and each ink composition were allowed to stand for 24 hours under an environment at 25° C., and the temperatures of the inkjet recording device and the ink composition were adjusted to 25° C. Then, at 25° C., printing was continuously performed on PVC80 (manufactured by LINTEC Corporation) using each ink composition, and then the ink composition was cured with a UV integrated light amount of 180 mJ/cm$^2$ by use of a UV-LED light lamp manufactured by Phoseon Technology at a distance of 2 cm between the lamp and the ink-coated surface. A state of the coating film was visually confirmed by touching the surface of this coating film with a finger, and the evaluation was performed according to the following evaluation criteria.

(Evaluation Criteria)
  o: No fingerprint adhered to the coating film.
  Δ: A few fingerprints adhered to the coating film.
  x: Fingerprints adhered to the coating film.

<Adhesiveness to Base Material>

Each ink composition obtained in Examples and Comparative examples was printed on a surface of an acrylic plate (Acrylite L/S, manufactured by Mitsubishi Chemical Corporation) using a commercially available inkjet printer, and irradiated with ultraviolet rays to obtain a cured coating film. The obtained coating film was cross-cut with a cutter knife, and cellophane tape (product name: Cellulose tape (Registered Trademark), manufactured by NICHIBAN Co., Ltd.) was put on the cut part and peeled off to evaluate a degree of the peeling of the cured coating film according to the following evaluation criteria.

(Evaluation Criteria)
  o: The peeling rate of the cured coating film was 0%.
  Δ: The peeling rate of the cured coating film was greater than 0% and less than 20%.
  x: The peeling rate of the cured coating film was 20% or more.

<Bending Resistance>

Each ink composition obtained in Examples and Comparative examples was printed on a surface of a PET film (E5100, manufactured by TOYOBO CO., LTD.) using a commercially available inkjet printer, and irradiated with ultraviolet rays to obtain a cured coating film. The obtained coating film was bent by 180 degrees, and a state of cracking was visually confirmed and evaluated according to the following evaluation criteria.

(Evaluation Criteria)
  o: No cracking such as fine cracks occurred in the coating film.
  Δ: Fine cracks occurred in the coating film.
  x: Evident cracks occurred in the coating film.

<Abrasion Resistance>

Each ink composition obtained in Examples and Comparative examples was printed on a surface of a PVC plate (T938, manufactured by C.I. TAKIRON Corporation) using a commercially available inkjet printer, and irradiated with ultraviolet rays to obtain a cured coating film. The obtained coating film was rubbed with a bleached cloth with a load of 500 g×100 times using a Gakushin-Type fastness tester (manufactured by Daiei Kagaku Seiki MFG Co., Ltd.), where a degree of rubbing-off of the coating film was visually observed and evaluated according to the following evaluation criteria.

(Evaluation Criteria)
  o: The coating film was not rubbed off.
  Δ: The coating film had a scratch on its surface.
  x: The coating film was evidently rubbed off.

<Solvent Resistance>

Each ink composition obtained in Examples and Comparative examples was printed on the surface of the PVC plate (T938, manufactured by C.I. TAKIRON Corporation) using a commercially available inkjet printer, and irradiated with ultraviolet rays to obtain a cured coating film. The obtained coating film was rubbed with a bleached cloth containing ethanol with a load of 200 g×10 times using the Gakushin-Type fastness tester (manufactured by Daiei Kagaku Seiki MFG Co., Ltd.), where a degree of rubbing-off of the coating film was visually observed and evaluated according to the following evaluation criteria.

(Evaluation Criteria)
  o: The coating film was not rubbed off.
  Δ: The coating film had a scratch on its surface.
  x: The coating film was evidently rubbed off.

<Banding>

Each ink composition obtained in Examples and Comparative examples was printed on the surface of the PVC plate (T938, manufactured by C.I. TAKIRON Corporation) using a commercially available inkjet printer, and irradiated with ultraviolet rays to obtain a cured coating film. Glossiness of the obtained coating film was measured using a variable angle gloss meter (Gross Meter VG7000, manufactured by Nippon Denshoku Industries Co., Ltd.) under a condition of a measurement angle at 60° and evaluated according to the following criteria.

(Evaluation Criteria)
  o: The measured value was 15.0 or more.
  Δ: The measured value was 10.0 or more and less than 15.0.
  x: The measured value was less than 10.0.

As shown in Table 1, the ink composition for photocurable inkjet printing of the present invention was excellent in ejection stability, viscosity stability, curability, adhesiveness to a base material, bending resistance, abrasion resistance, solvent resistance, and banding property. On the other hand, the ink composition of Comparative example 1, which contained an excessive amount of photopolymerization initiator, was inferior in evaluation results of bending resistance and banding. Comparative example 2, in which neither ethoxy(2,4,6-trimethylbenzoyl)phenylphosphine oxide nor bis(2,4,6-trimethylbenzoyl)phenylphosphine oxide was used, was inferior in evaluation result of banding. The ink composition of Comparative example 3, which contained an excessive amount of photopolymerizable compound, was inferior in evaluation result of adhesiveness to a base material. The ink composition of Comparative example 4, which contained a small amount of photopolymerizable compound, was inferior in evaluation result of curability. The ink composition of Comparative example 5, which did not contain N,N-dimethylacrylamide, was inferior in evaluation result in viscosity stability. The ink composition of Comparative example 6, which contained a small amount of amine-modified oligomer, was inferior in evaluation results of curability and bending resistance. The ink composition of Comparative example 7, which contained an excessive amount of amine-modified oligomer, was inferior in evaluation result of banding.

The invention claimed is:

1. An ink composition for photo-curable inkjet printing, comprising a pigment, a photopolymerizable compound, and a photopolymerization initiator,
   wherein the photopolymerizable compound comprises 5 to 30% by mass of an amine-modified oligomer and 5 to 30% by mass of N,N-dimethylacrylamide,
   wherein the photopolymerization initiator comprises at least any one of ethoxy(2,4,6-trimethylbenzoyl)phenylphosphine oxide and bis(2,4,6-trimethylbenzoyl) phenylphosphine oxide, and
   wherein a total amount of ethoxy(2,4,6-trimethylbenzoyl) phenylphosphine oxide and bis(2,4,6-trimethylbenzoyl)phenylphosphine oxide is 12% by mass or less.

2. The ink composition of claim 1, wherein the photopolymerization initiator is ethoxy(2,4,6-trimethylbenzoyl)phenylphosphine oxide.

* * * * *